June 28, 1966 R. C. CRETE 3,258,585
LIGHTING SYSTEM FOR PHOTOGRAPHIC PORTRAITURE
Filed March 23, 1964 3 Sheets-Sheet 2
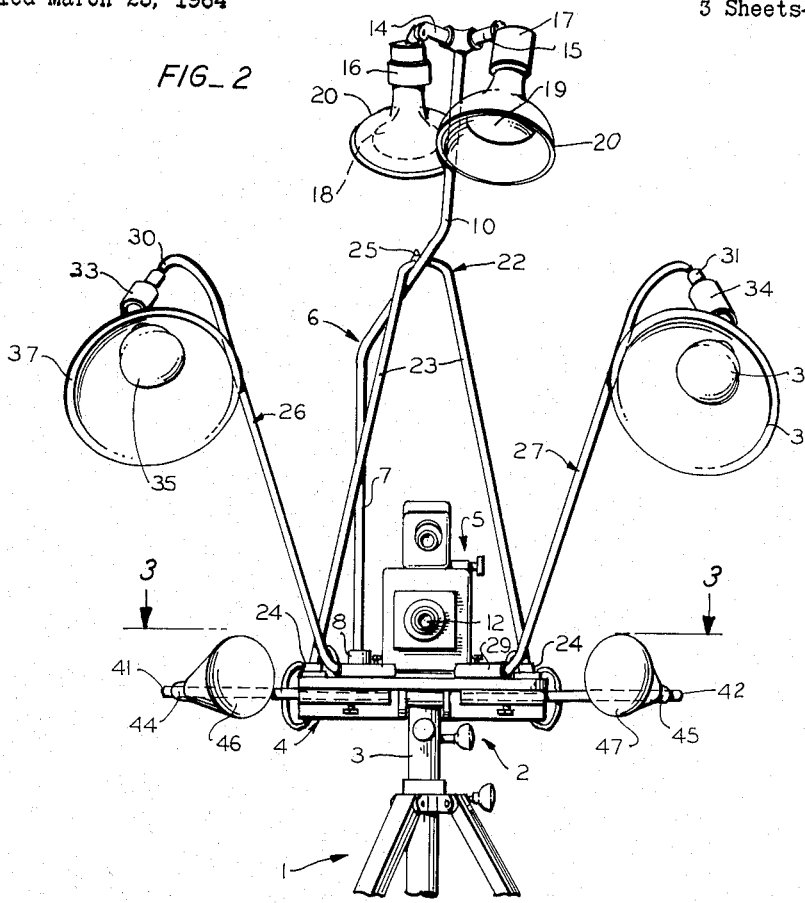
FIG_2
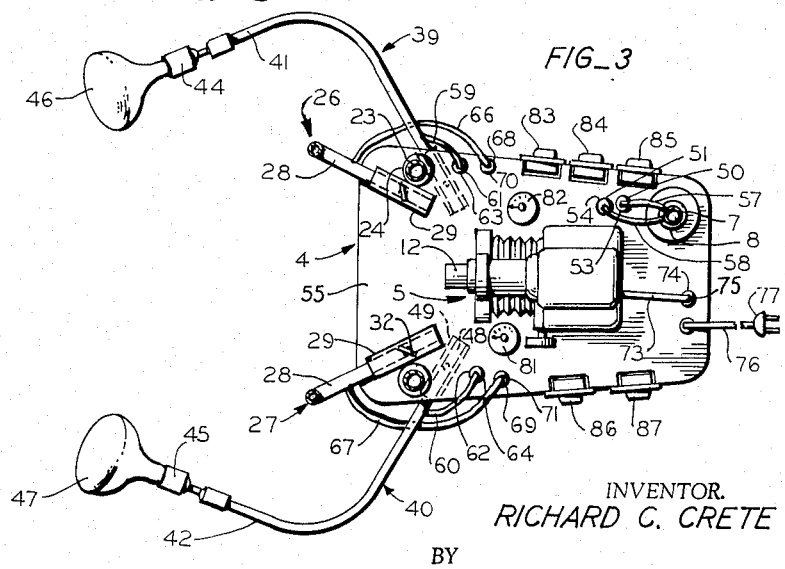
FIG_3
INVENTOR.
RICHARD C. CRETE
BY
Boyken, Mohler & Fouler
ATTORNEYS

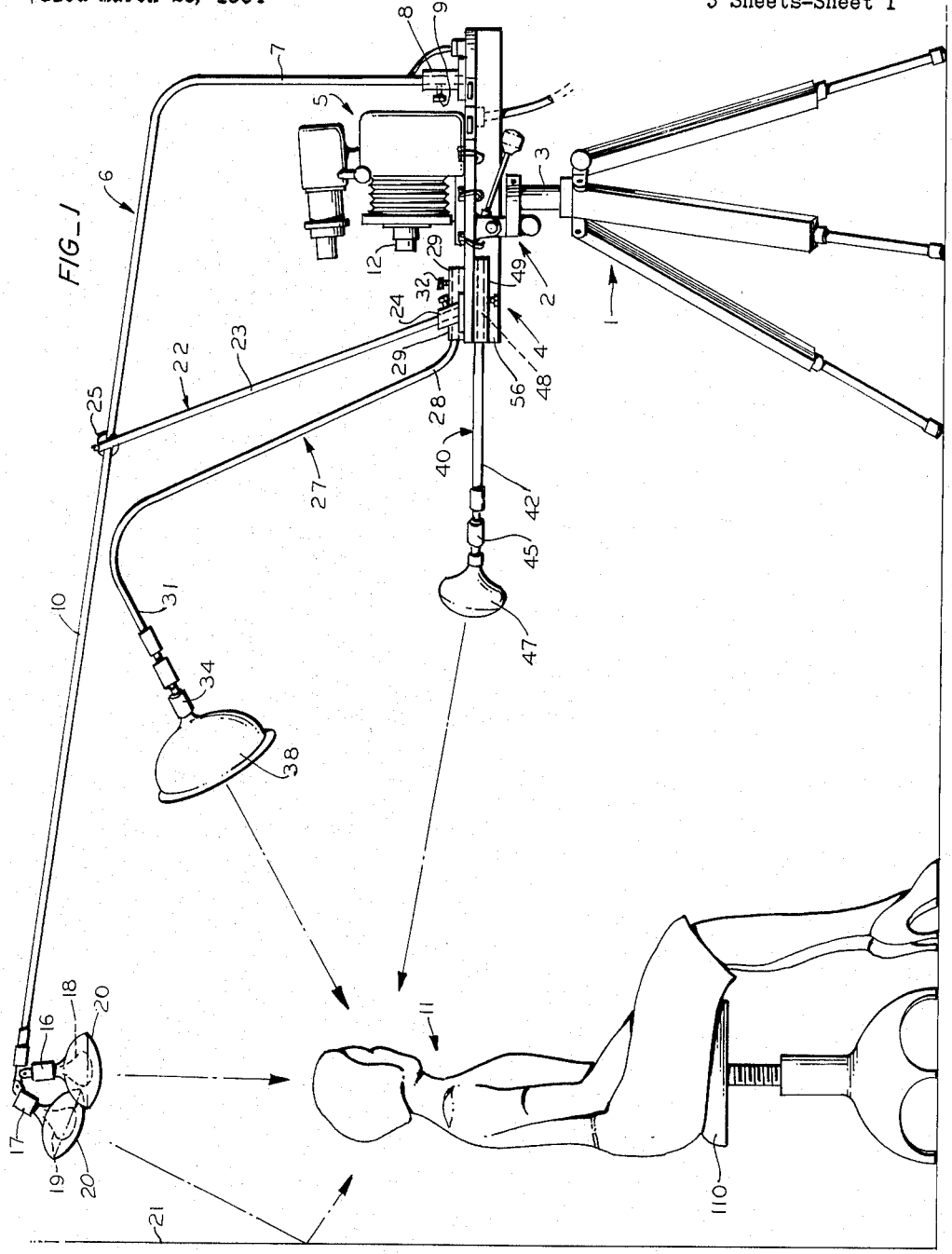

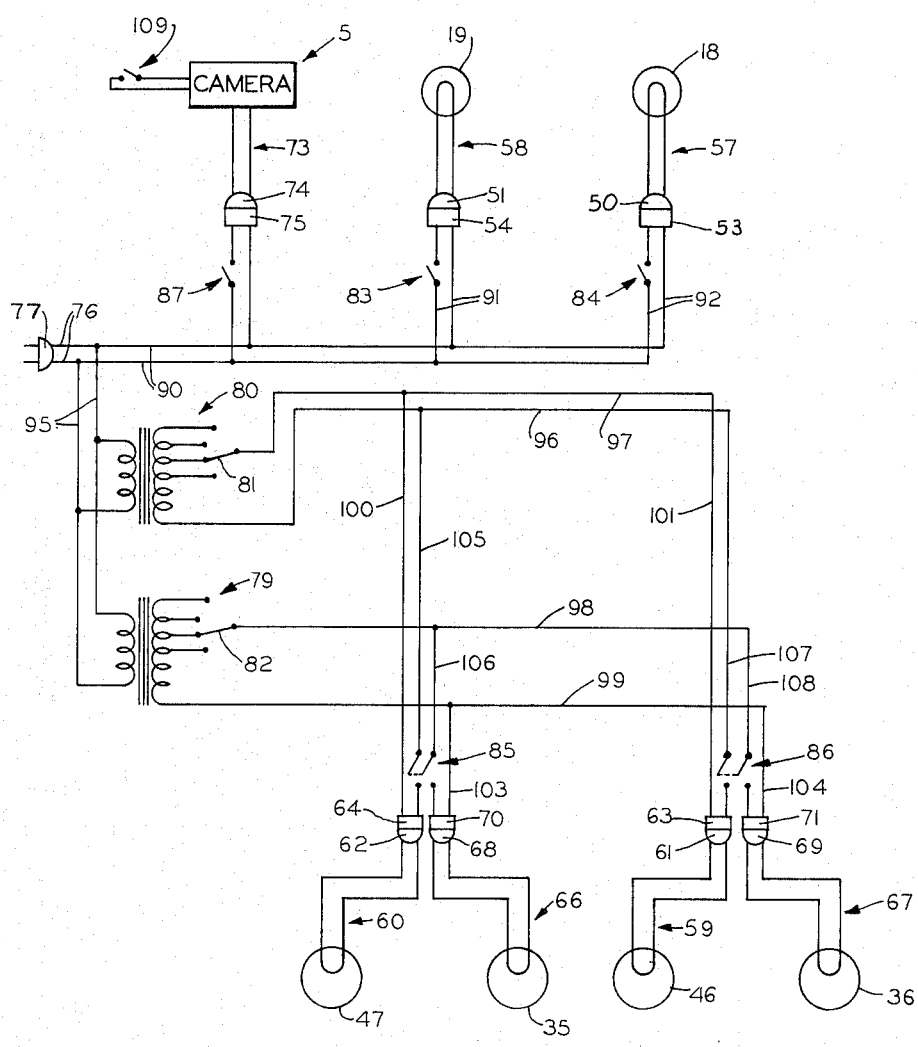
FIG_4

United States Patent Office 3,258,585
Patented June 28, 1966

3,258,585
LIGHTING SYSTEM FOR PHOTOGRAPHIC PORTRAITURE
Richard C. Crete, 25 S. School St., Lodi, Calif.
Filed Mar. 23, 1964, Ser. No. 353,847
6 Claims. (Cl. 240—1.3)

This invention relates to photographic apparatus, in general, and more specifically to a piece of lighting equipment for portraiture.

Heretofore, the taking of an aesthetically pleasing portrait, photographically, of high professional quality within a studio, and by artificial light, has required not only high skill and knowledge of the lighting required to avoid displeasing shadows and a bad distribution of light and shade, but has been time consuming and laborious. This is particularly true where the photographer is required to take hundreds of portrait photographs of the members of a school or school class within a fixed time limit to meet a publication date. Relatively bulky light standards must be moved thousands of times during the day to give variety to the photographs, and to vary the values in each photograph. Each conventional lighting standard has had a conductor wire connected therewith that must be dragged across the floor with each adjustment of the light standards, and the wires connected to several such standards are a constant tripping hazard to the photographer and others.

In view of the foregoing operations common to present day photography, it is necessary for the photographer to employ one or more assistants to adjust the lights, and even then approximately twenty minutes is required for each picture.

One of the objects of the present invention is the provision of a unitary device comprising a camera support that includes all of the lighting system necessary for taking photographic portraits in different poses, and of the highest professional quality, free from the disadvantages noted above.

Another object of the invention is the provision of a camera support that includes an electrical circuit and a plurality of electric light bulbs supported in positions essential to properly illuminating the sitter when the latter is in one of several different poses at the desired distance from the camera that is on said support. The circuit in this arrangement may be connected with a source of electricity by a single conductor cord, and control means is on said support and in said circuit for regulating the intensity of the light bulbs, and the combinations thereof required for each pose and for the different light reflecting characteristics of the skin of different sitters.

An added characteristic is the provision of means that enables a photographer to take each of many portraits without the help of others and within half the time heretofore required when using conventional equipment and methods, and which portraits are of uniformly high professional quality, thus eliminating the necessity and expense of retaking portraits that have been faulty due to lighting failure or faulty estimates of lighting requirements.

Other objects and advantages will appear in the description and drawings.

In the drawings, FIG. 1 is a side elevational view of the apparatus in position for taking a picture.

FIG. 2 is a front elevational view of the apparatus of FIG. 1.

FIG. 3 is a sectional view taken along line 3—3 of FIG. 2.

FIG. 4 is a wiring diagram of the electrical system.

In detail the apparatus shown in the drawings comprises a base generally designated 1, which is shown in FIG. 1 as a tripod supported on rollers or casters for movement on the floor, and which base may include a conventional head 2 on an elevator post 3 for raising and lowering the head to the desired height, and which head is adapted to swivel about a vertical axis and to be tilted to any desired degree. This is conventional in tripod heads.

Carried on said head 2 and releasably secured thereto is a camera support 4. Support 4 may be in the form of a horizontal platform or table on which a conventional camera 5 is releasably secured. The camera illustrated is a conventional 70 mm. motor driven portrait camera, that includes a magazine and viewer. The invention is not restricted to any type of camera, however, but where, as in the present instance, it includes an electric drive, provision is made in the support 4 for connecting it in an electrical circuit, as will be described later on.

Carried on the camera support 4 is a tubular member 6 that includes an upwardly extending leg 7 that is releasably secured at its lower end in a socket member 8 by a set screw 9. Screw 9 threadedly extends through a side of said socket member 8 for releasably engaging the lower end of leg 7, and said socket is rigid with support 4.

The tubular member 6 includes an arm 10 that extends forwardly and upwardly from the upper end of leg 7 to terminate at its forward end at a point that is approximately over and spaced above the head of a sitter 11 when the latter is seated relative to the camera for a head and shoulder portrait.

Hereafter the words "forward," "forwardly," "rear," "rearwardly" and words of similar connotation will be used with reference to the camera 5. Lens 12 on the camera projects "forwardly," and the operator would be at the opposite side or "rearwardly" of the camera.

Also the word "inner" used with reference to arm 10 and to other projecting members, refers to the end nearest the camera and support 4, while the "outer" end is the end remote from the camera and support 4.

Carried at the forward outer end of arm 10 is a pair of short branch members 14, 15 (FIG. 2) that project from said outer end, and bulb sockets 16, 17 respectively having bulbs 18, 19 therein. Reflectors 20 may be on sockets 16, 17 for bulbs 18, 19. Either or both bulbs may be of a reflector type.

Sockets 16, 17 normally support the bulbs in positions directed generally downwardly, so that bulb 18 will illuminate the hair of the sitter 11. This light may therefore be called the "hair light" while bulb 19 will normally be directed against the backdrop 21 (FIG. 1), and therefore the light bulb 19 may be called the "back light." Conventional pivotal or swivel joints connect the sockets 16, 17 with the branch arms 14, 15 so that they may respectively be swung to and from their normal positions to vary the hair and backdrop lighting if found desirable.

A brace 22 of generally inverted V-shaped is spaced forwardly of the leg 7 and has its legs 23 (FIG. 2) removably supported at their lower ends in sockets 24 that are rigid on support 4. The closed upper end of the brace may rotatably extend through a bracket 25 that is secured on arm 10 at a point intermediate the ends of said arm. Thus the tubular member 6 may be detached from the camera support 4, and when so detached the legs of brace 22, which are carried by arm 10, will also be removed from sockets 24 and may swing to a position with legs 23 of said brace at opposite sides of arm 10.

Also releasably carried by the camera support 4 is a pair of similar tubular arms 26, 27 each having rear end sections 28 releasably held in horizontally disposed socket members 29 that, in turn, are rigidly secured on support 4. These arms 26, 27 are symmetrically positioned at opposite sides of a vertical plane bisecting the camera 5 and support 4 longitudinally of the camera.

The forward end portions 30, 31 of arms 26, 27 respectively are directed generally toward each other, but forwardly, so their longitudinal axes will intersect at a point forwardly of said portions 30, 31.

Secured on the terminating outer ends of the said end portions 30, 31 of arms 26, 27 are sockets 33, 34 for light bulbs 35, 36 that are respectively in reflectors 37, 38. Conventional swivel joints connect the sockets 33, 34 with the end sections 30, 31 to enable swinging the reflectors and bulbs above said joints. These swivel joints may be ball and socket joints to permit universal swinging of the sockets 33, 34 and the lamps and reflectors carried thereby.

Since the lamps or light bulbs 35, 36 are separately used to provide the main illumination of the face or head, according to the direction in which the head is turned, they may be called "main" lights.

The inner end portions 28 of the tubular members 26, 27 may be square tubing, with the sockets 29 also square in cross-sectional contour so the latter will telescopically receive end portions 28 therein, and said end portions 28 will not rotate in said sockets. Set screws 32 may threadedly extend through a side of each socket 29 to engage each end portion 28 that is therein.

Another pair of tubular arms 39, 40 is carried by support 4, and these arms are also symmetrically positioned relative to each other at opposite sides of a vertical plane bisecting said camera 5, longitudinally thereof, the same as arms 26, 27. Said arms 39, 40 are substantially in a horizontal plane and project divergently forwardly, and they have outer end portions 41, 42 that project generally toward each other (FIG. 3).

Lamp bulb sockets 44, 45 are secured to the outer ends of said outer end portions 41, 42 by ball and socket joints, and said sockets carry reflector-type electric light bulbs 46, 47.

The light bulbs 46, 47 are called "fill-in" lights, for the reason that they are secondary lights that lighten the shadow side of the head when one of the main lights illuminates the face.

The inner end portions 48 of the tubular members 39, 40 are releasably secured in socket members 49 in the same manner as the tubular members 26, 27 are secured to the base support 4.

The conductor cords respectively leading to the hair and back light bulbs 18, 19 extend through the tubular member 6 from sockets 16, 17 to points adjacent to the upper end of socket 8 where they extend through openings in leg 7. The inner ends of these conductors are respectively connected with conventional plugs 50, 51 having prongs releasably inserted into the electrical sockets 53, 54.

The base 4 or camera support is a horizontally disposed hollow panel having an upper wall 55 (FIG. 3) and relatively narrow sidewalls 56 (FIG. 1) and the lower side may be open for the tripod head to extend to the top panel or wall 55, which wall is rigid, and the sidewalls 56 may be integral therewith to further reinforce the top wall against any distortion under the weight and strain of the tubular members and lamps.

As already mentioned, sockets 53, 54 are secured in the top wall 55, and the conductor cords 57, 58 connect the plugs 50, 51 with sockets 16, 17.

Conductor cords 59, 60 (FIG. 3) connect plugs 61, 62, that are releasably held in prong receiving sockets 63, 64, with the light bulb sockets 44, 45 of the fill-in lights 46, 47. The prong receiving sockets 63, 64 are secured in top wall 55 of the base 4, and the conductor cords extend through the tubular members 39, 40 to said light bulb sockets 44, 45.

Conductor cords 66, 67 connect plugs 68, 69 with prong receiving sockets 70, 71 that, in turn, are secured in the base 4, and said cords 66, 67 extend through tubular members 26, 27 to the sockets 33, 34 of the main light bulbs 35, 36.

The cords 59, 60, 66, 67, in each instance, extend from the tubular members 39, 40 and 26, 27 through openings in the sides thereof adjacent to the sockets on base 4 that carry said tubular members.

By the above arrangement, all of the plugs 50, 51, 61, 62 and 68, 69 may be pulled out of their plug sockets 53, 54, 63, 64 and 70, 71 and the tubular members 6, 26, 27, 39, 40 separated from base 4 for convenience in transporting the tubular members and base separately, and said tubular members can again be quickly connected to the base and the plugs reinserted in the plug sockets.

A conductor cord 73 connects the camera 5 with a plug 74, the prongs of which are releasably held in a plug socket 75 in top wall 55 of the base, and the main power cord 76 has a plug 77 that is adapted to be plugged into a plug socket that is connected with a source of electricity.

Each of the electrical cords hereinbefore identified may be a two wire cord, since a conventional A.C. power source is contemplated.

FIG. 4 is a simplified wiring diagram in which a circuit is shown that includes a pair of variable transformers 79, 80, having conventional manual control elements indicated at 81, 82 in FIG. 3 that are mounted on upper wall 55 and accessible to the operator.

Referring to FIG. 3, the upper edge or side of the base or camera support 4 is the right hand side of the base when it is horizontal in camera supporting position. Along this edge are three manually actuatable switches 83, 84, 85, while along the left hand side, which is the lower edge or side of the base 4 as seen in FIG. 3, are a pair of manually actuatable switches 86, 87.

The base 4, as already mentioned, is hollow and, as seen in FIG. 3, the switches 83–87 are all readily accessible to the operator, while the wiring, for the most part is within the base 4, which wiring, as seen in FIG. 4, includes conductor wires 90 that are connected through conductors 76 with plug 77 that is adapted to be connected with the central source of power for supplying all of the electrical components of FIG. 3. Pairs of branch wires 91, 92 connect with base plug sockets 54, 53, and switches 83, 84 are in said branch lines or wires 91, 92.

Thus the actuation of switch 83 will connect the back light 19 with the source of electricity while actuation of switch 84 will connect the hair light 18 with said source.

Conductors 95 connect with the conductors 90 and variable transformers 79, 80 which regulate the current in two pairs of conductors, one pair being conductors 96, 97 and the other being conductors 98, 99.

A pair of conductors 100, 101 extend from conductor 97 to one of the terminals of plug sockets 63, 64, and a pair of conductors 103, 104 connect with conductor 99. Switch 85 will connect the right main light bulb 35 and the left fill light bulb 47 with conductors 96, 98 upon moving the switch to closed position through conductors 105, 106, whereupon the current to the right main light may be varied by actuation of the arm 82 of variable transformer 79, and the current to the left fill light bulb may be varied by actuation of arm 81 of the variable transformer 80. Both the right main and the left fill light will simultaneously be actuated by actuation of switch 85 to closed position.

When the switch 86 is moved to closed position the left main light bulb 36 and the right fill light bulb 46 will be actuated, since conductors 107, 108 will connect the other terminals of the plug sockets 63, 71 with conductors 96, 98. The left main and right fill lights can then be independently controlled as to current by manipulation of the variable transformers 79, 80.

A switch 109 in the camera circuit itself is adapted to be closed for actuating the shutter. The switch 87 merely connects the camera circuit with the source of electricity.

The position of the sitter 11 relative to the camera 5 is predetermined by focussing the camera, and in the present instance the stool 110 which may be adjustable for height, and may swivel, is normally in the correct position, hence, where a large number of portraits are taken for a publication, there is no need to change the location of the stool.

The head and shoulders are turned partially to the right or to the left relative to the camera for aesthetic reasons.

In operation, after the sitter has been posed and plug 76 is connected with a source of electricity, the switch 87 is closed and if, as in FIG. 1, the head of the sitter is turned partially to the left, the operator will usually close switches 83, 84, to actuate the back light 19 and the hair light 18. The switch 85 is then closed and the right main light 35 and the left fill light 47 are simultaneously actuated.

If the subject has a fair complexion, the variable transformers may be adjusted to reduce the illumination, or if the subject has quite a dark skin, the intensity of the main and fill lights is increased, or either may be varied to obtain the best results.

The switch 109 may then be actuated and the exposure will be made.

Should the subject's head be turned to the right, the switch 86 will be actuated instead of switch 85 and the left main light bulb 36 and right fill bulb 46 will be actuated.

The various bulbs are ordinary light bulbs, as distinguished from photoflood lamps or flash bulbs or other lamps specially designed for photographic work, although for color photographs they may be changed to provide the desired lighting.

The employment of the variable transformers, or rheostats or other means for providing the desired light intensity, is not absolutely essential for the back light and hair light, and it is obvious that either of these may be eliminated by actuation of switches 83, 84, since there are times when either one or the other or both may not be desired. However, the main and fill lights are quite important, as is the regulation of their intensity.

The arrangement of the switches on the base 4 is one that is designed to avoid confusion, since the farthest light from the operator is the back light switch, and the switch for the right main light is on the right side, while the switch for the left main light is on the left side.

Basically, the invention may be said to include a base on which a camera is adapted to be supported in a position with the axis of its lens extending generally horizontally and two pairs of electric light bulbs, either in reflectors or having reflectors, with said pairs being substantially the same, and substantially correspondingly positioned at opposite sides of a vertical plane in which said optical axis is disposed with one light of each pair in a common level above said axis and the other light of each pair below said axis. An electrical circuit, including switches, is carried by said base, which circuit and switches are arranged so that one of the bulbs at each side of said optical axis may be turned on to provide a main and a fill light according to the position of the face of the sitter whose portrait is being taken, and said base also provides control means for varying the intensity of the light in said bulbs, as desired.

This concept may further include the additional back and hair lights, and the single cord connection between the circuit in said base and a source of electrical current, as well as the removability of the light bulbs and the means for supporting them in their respective positions.

The arrangement of the lights on a single base that also supplies the camera, and which lights (except the back light) are normally positioned relative to said base and camera to illuminate the head of the sitter, when such head is substantially in the vertical plane in which the optical axis of the camera, on said base, is disposed, substantially removes the present risks in taking portraits, as well as saving approximately half the time and eliminating the labor hereafter involved.

The operator need not be concerned with the fill lights, since they are automatically actuated, and it is only necessary for the operator to turn on the light that is directed toward the sitter's face.

While the invention is not to be restricted to lights of any exact wattage, nevertheless it has been found by actual practice that a 150 w. reflector spot light bulb for the hair and a 250 w. bulb in a reflector for the backdrop is satisfactory. The main lights may be 250 w. bulbs in reflectors, and the fill lights may be 150 w. bulbs in reflectors.

Obviously, the main and fill lights may be of higher maximum wattage and the variable transformer may reduce the output to 250 w. and 150 w. for average complexions, and lower or higher for darker or lighter complexions.

It should be noted that conventional electronic flash tubes may be used instead of conventional incandescent lamp bulbs, insofar as the basic arrangement of the light bulbs is concerned, and the camera base, in which instance the source of electricity may be a battery and the variable transformers would not be necessary.

Hereinbefore where the words "left" or "right" are used in defining the direction in which the head faces, these words are used relative to the sitter, and not the operator, hence the right main light (which is the right hand light from the operator's standpoint) is always used when the sitter faces to the left (from the sitter's position). In FIG. 1 the sitter is facing to the left and the right main light and left fill lights are on, so that the face of the sitter will be directed toward the right main light, and the left fill light, which is of lower intensity, will fill in the shadow cast by use of the main light.

Although only one embodiment of the invention is illustrated and described, it will be apparent to those skilled in the art that various changes and modifications may be made therein without departing from the spirit of the invention or from the scope of the appended claims.

I claim:

1. A camera support for use in portrait photography comprising:
    (a) a base on which a camera is adapted to be supported in a position with the optical axis of its lens extending generally horizontally;
    (b) two pairs of electric light bulbs including reflectors for reflecting the light rays in a direction generally away from such camera and said base and toward a point along said axis at which the person to be photographed is to be positioned;
    (c) bulb supporting and positioning means on said base for supporting each pair of said electric light bulbs substantially equally spaced at opposite sides of a vertical plane in which said optical axis is disposed and forwardly of such camera relative to said lens, with one bulb of each pair in a substantially common level spaced substantially above said axis, and the other bulb of each pair in a substantially common level spaced below said axis, when said camera is in said position thereby providing an upper pair of bulbs above said axis and a lower pair of bulbs below said axis;
    (d) an electrical circuit carried by said base in which said pairs of bulbs are connected; and
    (e) switches on said base and in said circuit actuatable for closing said circuit to a different bulb of each pair respectively above and below said axis upon separate actuation of certain of said switches whereby the upper light of one pair and the lower light of the other pair or the other bulbs of said pairs may be turned on according to the switches that are actuated;
    (f) current control means in said circuit for varying the output of the bulbs actuated by either of said switches; and
    (g) the bulbs of said upper pair being supported by said bulb supporting and positioning means substantially farther from said base and such camera and closer to said point on said axis than the bulbs of said lower pair whereby in bulbs of the same wattage the intensity of the rays from each bulb of said upper pair striking a person at said point will be substantially greater than the intensity of rays from each bulb of said lower pair striking said person, and the distance of the bulbs of said lower pair from a midpoint between said base and said point along said axis being closer than the distance from said bulbs of said lower pair to said base and the camera adapted to be positioned on the latter.

2. A camera support for use in portrait photography comprising:
 (a) a base on which a camera is adapted to be supported in a position with the optical axis of its lens extending generally horizontally;
 (b) a plurality of pairs of elongated tubular members each having an electric light bulb socket at one end thereof and swivel means swivelly connecting each socket with said one end of each tubular member;
 (c) securing means on said base for removably securing the other end of each tubular member to said base;
 (d) said one end of the members of one pair thereof being equally spaced above and at two opposite lateral sides of said optical axis and said one end of the members of a second pair of said members being equally spaced below and at two opposite lateral sides of said optical axis and the said one of the ends of both of said pairs being spaced a substantial distance forwardly of said camera relative to its lens when said camera is on said base with the said one of the ends of the pair of tubular members above said axis extending a substantial distance further from said base and toward the person to be photographed when such person is substantially on said axis than the said one of the ends of the pair of tubular members below said axis;
 (e) a plurality of switches on said base and an electrical circuit within said base and members connected with said bulb sockets and switches for selectively conducting current to said light bulbs for lighting them upon selective actuation of said switches; and
 (f) a rheostat on said base and in said circuit for controlling the amount of current to said light bulbs of the pair thereof below said axis when said bulbs are illuminated;
 (g) means for connecting said circuit with a source of electrical power;
 (h) said circuit including conductor cords respectively extending through each of said tubular members connected with a conductor plug at said outer end of each tubular member and with the bulb socket at said one end of each tubular member; and
 (i) said means for connecting said circuit with a source of electrical power including a plug socket on said base for releasable connection with each of said plugs, whereby said tubular members including the conduction cords within each member may be separately disconnected from and re-connected with said base as separate units.

3. A camera support for use in portrait photography comprising:
 (a) a base on which a camera is adapted to be supported in a position with the optical axis of its lens extending generally horizontally;
 (b) two pairs of electric light bulbs including reflectors for reflecting the light rays in a direction generally away from such camera and said base and toward a point along said axis at which the person to be photographed is to be positioned;
 (c) bulb supporting and positioning means on said base for supporting each pair of said electric light bulbs substantially equally spaced at opposite sides of a vertical plane in which said optical axis is disposed and forwardly of such camera relative to said lens, with one bulb of each pair in a common level spaced substantially above said axis, and the other bulb of each pair in a common level spaced below said axis, when said camera is in said position;
 (d) an electrical circuit carried by said base in which said pairs of bulbs are connected; and
 (e) a pair of switches on said base and in said circuit respectively actuatable for simultaneously closing said circuit to a different bulb of each pair respectively above and below said axis upon separate actuation of said switches whereby the upper light of one pair and the lower light of the other pair or the other bulbs of said pairs may be simultaneously turned on according to the switch that is actuated; and
 (f) said bulb supporting and positioning means supporting the said bulbs above said axis a greater distance from said camera and base and closer to said point on said axis than the said bulbs below said axis, and also supporting said bulbs above said axis spaced further from said vertical plane than said bulbs below said axis.

4. A camera support comprising:
 (a) a base on which a camera is adapted to be supported in a position with the optical axis of its lens extending generally horizontally;
 (b) a plurality of pairs of elongated tubular members each having an electric light bulb socket at one end thereof and swivel means swivelly connecting each socket with said one end of each tubular member;
 (c) securing means on said base for removably securing the other end of each tubular member to said base;
 (d) said one end of the members of one pair thereof being equally spaced above and at two opposite lateral sides of said optical axis and said one end of the members of a second pair of said members being equally spaced below and at two opposite lateral sides of said optical axis and the said one of the ends of both of said pairs being spaced a substantial distance forwardly of said camera relative to its lens when said camera is on said base;
 (e) a plurality of switches on said base and an electrical circuit within said base and members connected with said bulb sockets and switches for selectively conducting current to said light bulbs for lighting them upon selective actuation of said switches;
 (f) control means on said base and in said circuit for controlling the amount of current to said light bulbs when said bulbs are illuminated;
 (g) means for connecting said circuit with a source of electrical power;
 (h) a third pair of electric light bulbs including reflectors;
 (i) means on said base for supporting said third pair spaced forwardly of said lens and at a level above the level at which the uppermost of the bulbs of said two pairs are supported and in positions directed generally downwardly and generally toward said optical axis;
 (j) conductors connected with said circuit enclosed by said last mentioned means connecting the bulbs of said third pair with said circuit; and
 (k) switches in said circuit for selectively connecting and disconnecting the bulbs of said third pair in said circuit.

5. In combination with a camera having a lens at the front side thereof:
 (a) a base on which said camera is supported in a position with the optical axis of its said lens generally horizontal;
 (b) two pairs of separate electrical illuminating means including reflectors respectively associated therewith for reflecting rays of light from each of said illuminating means to one side thereof;

(c) supporting means supported on and connected with said base supporting each pair of said illuminating means substantially equally spaced at opposite sides of a vertical plane in which said optical axis is disposed and a substantial distance forwardly of said lens with one illuminating means of each pair disposed in an upper level spaced substantially above said axis, and with the other illuminating means of each pair thereof in lower level spaced a substantial distance below said upper level;

(d) an electrical circuit carried by said base in which said pairs of illuminated means are connected;

(e) the reflectors associated with said illuminating means of said two pairs being in positions for reflecting the major portion of the rays of light from each of said illuminating means in a direction away from said lens and generally toward a point on said axis;

(f) a pair of switches on said base and in said circuit respectively manually actuatable for simultaneously closing said circuit to a different illuminating means of each pair respectively positioned at said upper level and at said lower level, whereby the pair of lights at one level may simultaneously illuminate different surface areas on the face of a sitter positioned at said point on said axis.

(g) the wattage of the illuminating means at said lower level being less than the wattage of the illuminating means in said upper level whereby said illuminating means in said lower level will constitute fill-in illuminating means for shadows cast by one or the other of said illuminating means at said upper level.

6. A camera support for use in portrait photography, comprising:

(a) base on which a camera including a lens, is adapted to be supported in a position with the optical axis of its lens extending generally horizontally toward the face of the person to be photographed;

(b) an electrical circuit and a pair of electric light bulbs in said electrical circuit, including reflectors for reflecting the light rays from said bulbs generally toward the face of such person when the latter is in a position spaced in front of such lens and substantially along said axis, (c) a first bulb supporting means on said base for supporting one bulb of said pair at one side of a vertical plane in which said axis is disposed and below the level of said axis at a point spaced a substantial distance forwardly of such camera and spaced between such face and said camera when the latter is on said base and when said person is in said position;

(d) a second bulb supporting means on said base for supporting the other bulb of said pair at the other side of said vertical plane and above the level of said axis at a point spaced a greater distance forwardly of said such camera and closer to a person in said position than the spacing between said one bulb and said camera when the latter is on said base, whereby the intensity of light from said other bulb impinging on such subject will be greater than the intensity of the light impinging on said subject from said one bulb when said bulbs are of the same wattage;

(e) said first bulb supporting means supporting said other bulb at a distance from said camera and base and the said position of such face, that is closer to a midpoint between said base and such face than the distance between said base and said other bulb.

References Cited by the Examiner

UNITED STATES PATENTS

| | | | |
|---|---|---|---|
| 2,107,074 | 2/1938 | Hineline | 240—1.3 X |
| 2,314,033 | 3/1943 | Curran | 95—86 X |
| 2,339,657 | 1/1944 | Smith | 95—11 |
| 2,551,753 | 5/1951 | McCullough | 240—2 |
| 2,697,776 | 12/1954 | Wale | 240—52 X |
| 2,851,936 | 9/1958 | Seiden | 240—1.3 X |
| 2,965,747 | 12/1960 | Secofsky | 240—1.3 |
| 3,165,025 | 1/1965 | Hart | 240—1.3 X |

NORTON ANSHER, *Primary Examiner.*

J. F. PETERS, *Assistant Examiner.*